UNITED STATES PATENT OFFICE.

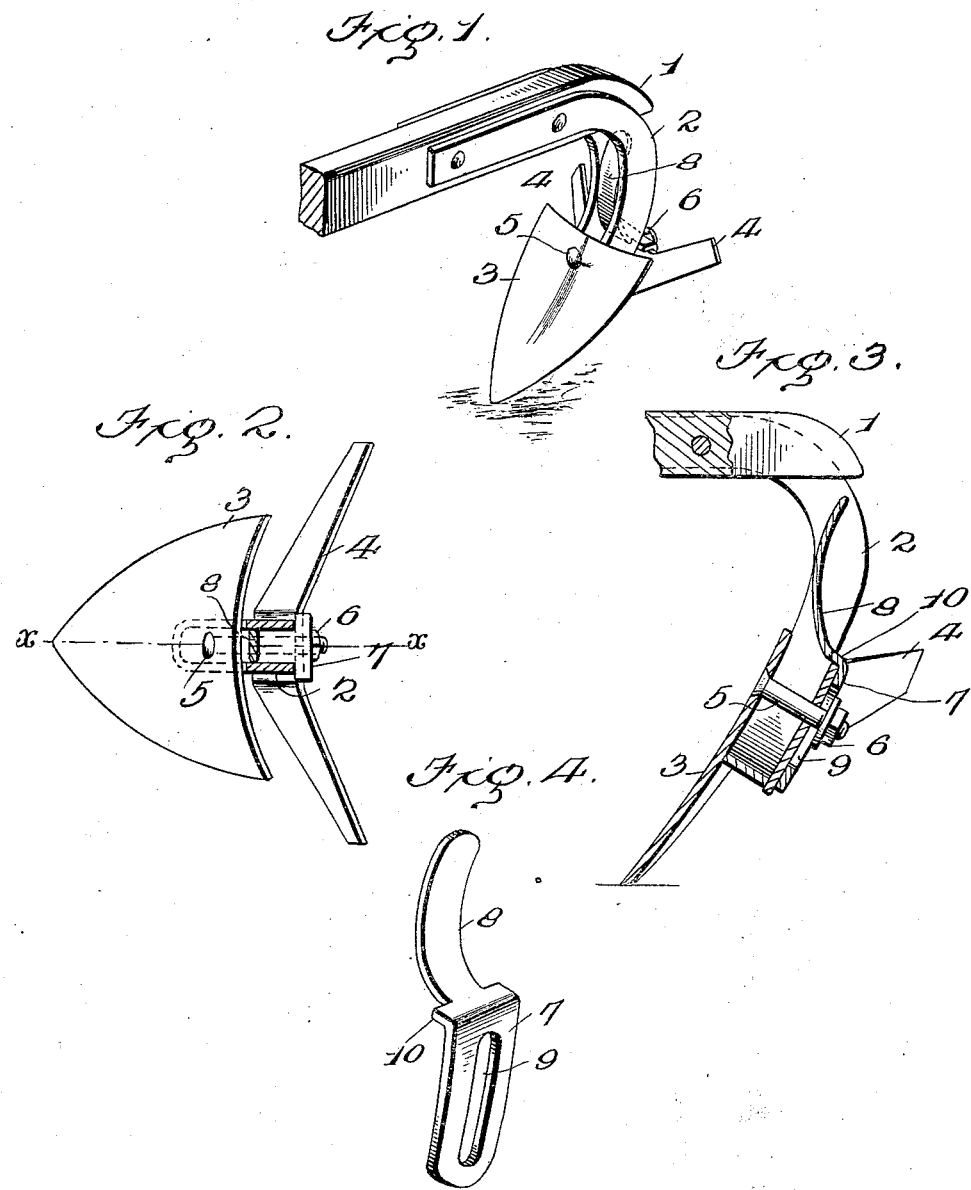

THOMAS P. MARTIN AND ALEXANDER J. MARTIN, OF SALE CITY, GEORGIA.

PLOW-SCRAPE BRACE.

No. 915,302.　　　　Specification of Letters Patent.　　　Patented March 16, 1909.

Application filed June 16, 1908. Serial No. 438,844.

*To all whom it may concern:*

Be it known that we, THOMAS P. MARTIN and ALEXANDER J. MARTIN, citizens of the United States, residing at Sale City, in the county of Mitchell and State of Georgia, have invented certain new and useful Improvements in Plow-Scrape Braces, of which the following is a specification.

The present invention has for its object to provide novel means for staying the scrape or sweep of a plow or cultivator shovel and which may be readily adapted to different styles and makes of implements and to different widths of scrapes or sweeps.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a plow embodying the invention. Fig. 2 is a horizontal section on a plane just below the beam. Fig. 3 is a vertical longitudinal section on the line $x$—$x$ of Fig. 2. Fig. 4 is a detail perspective view of the brace.

Corresponding and like parts are referred to in the following description and indicated in all the views of the drawings by the same reference characters.

The implement comprises a beam 1, standard 2, shovel 3 and scrape or sweep 4, said parts being of any well known construction and arrangement.

The standard 2 comprises transversely spaced members between which the bolt or fastening 5 passes, the same receiving a nut 6 for tightening and securing the parts in the adjusted position. The scrape or sweep 4 is doubled, the wings projecting similarly from opposite sides of the standard.

The brace consists of a plate 7 and arm 8, the latter being curved forwardly and upwardly so as to come between the members of the standard 2. An opening 9 is formed in the plate 7 for the passage of the bolt or fastening 5, said opening being vertically elongated to admit of adapting the members to scrapes or sweeps of different width. A flange 10 is provided at the upper end of the plate 7 and overhangs the scrape or sweep 4, thereby serving to prevent movement of the same upon the bolt or fastening 5 after the parts have been properly positioned and tightened.

The brace is arranged so that the plate 7 extends along the rear side of the scrape or sweep with its flange 10 in contact with the upper edge of said scrape or sweep and the arm 8 projected into the space formed between the members of the standard. When the nut 6 is screwed home upon the bolt or fastening 5, the brace is clamped and made secure and by reason of its flange 10 engaging with the upper edge of the scrape or sweep, the latter is prevented from movement upon the bolt or fastening, as will be readily understood.

Having thus described the invention, what is claimed as new is:

1. In an implement, comprising a standard, a shovel, a scrape, and a fastening connecting the shovel and scrape to the standard, a brace comprising a plate having an opening to receive the said fastening and held thereby to the standard, a flange at one end of the plate to engage over the upper edge of the scrape and prevent turning thereof, and an arm extended from the flanged end of the plate and adapted to engage with the said standard to prevent turning of the brace and scrape.

2. In an implement comprising a standard embodying transversely spaced members, a shovel placed against the front of the standard, a scrape fitted to the rear of the standard, a bolt passed between the members of the standard and connecting the shovel and scrape, and a brace comprising a plate having an opening receiving the said bolt and placed against the rear side of the scrape, a flange at the upper end of the plate extending over and in contact with the upper edge of the scrape to prevent relative turning thereof, and an arm extended upward and forward from the flanged end of the plate and fitting between the members of the standard.

3. The herein described brace for the purpose set forth, the same comprising a plate having a longitudinal opening formed therein, one end of the plate being bent at an angle to form a flange, and an arm extended from the flanged end of the plate in a relatively upward and forward direction.

In testimony whereof we affix our signatures in presence of two witnesses.

THOMAS P. MARTIN. [L. S.]
   ALEXANDER J. MARTIN. [L. S.]

Witnesses:
 FRED CROSBY,
 MINNIE S. CLARK.